United States Patent Office 2,719,866
Patented Oct. 4, 1955

2,719,866
SUBSTITUTED RESORCINOLS

Koert Gerzon, Indianapolis, Ind., assignor to Eli Lilly and Company, Indianapolis, Ind., a corporation of Indiana No Drawing. Application August 4, 1951,
Serial No. 240,437

8 Claims. (Cl. 260—619)

This invention relates to substituted resorcinols and more particularly to 4-(p-alkylbenzyl) resorcinols and methods for their preparation.

The compounds of the present invention may be represented by the formula

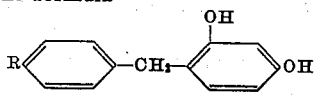

wherein R is an alkyl radical having from 1 to 9 carbon atoms, or a cycloalkyl radical having from 5 to 6 carbon atoms.

The novel alkylbenzyl resorcinols are water insoluble, low-melting solids or oils which are soluble in the common polar organic solvents.

The new compounds possess useful properties for combating parasites such as amoebae and helminths, and are characterized by their low toxicity and lack of irritation to the gastro-intestinal tract. When used therapeutically the compounds can be administered orally as such or in conjunction with a vehicle, such as a pharmaceutical diluent or extending medium. Most conveniently, the compounds are prepared for therapeutic use in aqueous suspension.

The new alkylbenzyl resorcinols are readily prepared by chloromethylation of an appropriate alkylbenzene, followed by condensation of the resulting p-alkylbenzyl chloride with resorcinol in the presence of zinc chloride. The following series of equations wherein R has the same significance as hereinabove illustrates generally a method of preparing the novel compounds.

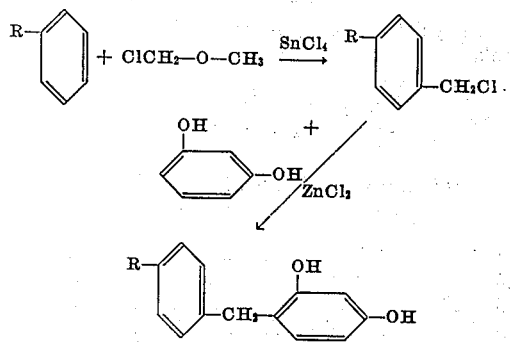

Alternatively, the new alkylbenzyl resorcinols can be prepared by condensation of an appropriately substituted p-alkylbenzene with paraformaldehyde in glacial acetic acid solution, in the presence of zinc chloride and a hydrogen halide, to yield the corresponding p-alkylbenzyl halide, which is then condensed with resorcinol as previously described.

The following examples will more specifically illustrate the new compounds and their preparation.

Example 1

A mixture of 168 g. (1.14 moles) of sec-amylbenzene, 92 g. (1.14 moles) of freshly distilled chloromethyl ether and 400 cc. of anhydrous carbon tetrachloride were placed in a flask fitted with a stirrer and a calcium chloride drying tube, and cooled to about —10 C. 73 g. (0.27 mole) of anhydrous stannic chloride were added dropwise over a period of about 3 hours while stirring and maintaining the temperature of the reaction mixture below about —5° C. with the aid of an ice-salt bath. After addition of the stannic chloride, the reaction mixture was stirred for one hour at about —5° C. and for one hour at about 0° C. The reaction mixture was then poured over a mixture of 200 g. of ice, 300 cc. of water and 50 cc. of concentrated hydrochloric acid and stirred vigorously for about 5 minutes. A two-phase system formed, and the lower, carbon tetrachloride phase, which contained the p-sec-amylbenzyl chloride formed in the reaction, was removed. The aqueous phase was washed with 200 cc. of carbon tetrachloride, the carbon tetrachloride separated, and combined with the original carbon tetrachloride phase. The combined carbon tetrachloride solutions were washed three times with 100 cc. portions of iced 10% aqueous hydrochloric acid and twice with 100 cc. portions of ice water. The carbon tetrachloride solution was dried over calcium chloride, and the solvent was removed under reduced pressure. The residue was fractionally distilled through an efficient fractionating column. Fractions were collected by observing the refractive indices of the distillate. The first fraction, composed of unreacted hydrocarbon and boiling at about 120–130° at 70 mm. of mercury had refractive index $n_D^{25}$ ranging from 1.4880 to 1.4900, and as recovered was suitable for use in another chloromethylation run. The p-sec-amylbenzyl chloride formed in the reaction distilled at about 100° C. at a pressure of 2 mm. of mercury, and the portion collected had refractive index $n_D^{25}$ ranging from 1.5050 to 1.5170. The p-sec-amylbenzyl chloride fraction was redistilled, collecting that portion of the distillate having refractive index between 1.5130 and 1.5150.

Analysis: Calculated for $C_{12}H_{17}Cl$, Cl=18.02. Found, Cl=17.73.

600 cc. of anhydrous benzene and a solution of 220 g. (2 mole) of resorcinol and 250 cc. of anhydrous ether were placed in a flask, and 27 g. (0.2 mole) of powdered anhydrous zinc chloride and one g. of aluminum chloride were added with stirring. The mixture was brought to refluxing temperature, and a solution of 197 g. (1 mole) of p-sec-amylbenzyl chloride in 200 cc. of anhydrous ether was added dropwise over a period of about two hours, with stirring. Stirring was continued for about one hour, and thereafter the ether was distilled off until the vapor temperature was about 80° C. Stirring was then continued under reflux for three hours, by which time evolution of hydrogen chloride had ceased. The reaction mixture was poured into one liter of ice water containing 25 cc. of concentrated hydrochloric acid. 500 cc. of ether were added and the organic layer was separated, and washed with two 300 cc. portions of dilute hydrochloric acid followed by three 300 cc. portions of water. The organic solvent solution was dried over sodium sulfate, and the solvent was removed by distillation. The residue, comprising the 4-[4-(1-methylbutyl)-benzyl]-resorcinol formed in the reaction, was transferred while still hot to a smaller flask adapted to fractional distillation. The residue was fractionally distilled at a pressure of 0.5 mm. of mercury. Unreacted resorcinol boiling at about 110–130° C. was first collected, the condenser and the receiver being kept warm to prevent solidification of the resorcinol in the tubing. When the vapor temperature rose to about 175° C., the receiver was changed and a straw-colored liquid, consisting of 4-[4-(1-methylbutyl)-benzyl]-resorcinol, was collected, the distillation being continued until the distillate became yellow. The product was redistilled at a pressure of 0.5 mm. of mercury and the 4-[4-1 methylbutyl)-benzyl]-resorcinol thus obtained boiled at 195–200° C. and had refractive index $n_D^{25}=1.5720$. The product did not crystallize. The bis(N-ethylcarbamate) derivative, prepared for purposes of characterization, melted at 153° C. The percentage figures obtained on analysis and reported in this and subsequent examples are for the bis(N-ethylcarbamate) derivatives.

Analysis: Calculated for $C_{24}H_{32}N_2O_4$: C=69.87; H=7.82; N=6.20. Found: C=69.78; H=8.12; N=6.49.

*Example 2*

The procedure of Example 1 was followed, except that 138 g. of isopropylbenzene were used. The 4-(4-isopropylbenzyl)-resorcinol thus obtained boiled at 190–195° C. at a pressure of 0.5 mm. of mercury and crystallized on standing at room temperature to form soft pale yellow crystals melting at about 50–55° C. The bis (N-ethylcarbamate) derivative melted at about 164.1–165.5° C.

Analysis: Calculated for $C_{22}H_{28}N_2O_4$: N=7.29. Found: N=7.08.

*Example 3*

The procedure of Example 1 was followed, except that 182 g. of phenylcyclohexane were used.

4-(4-cyclohexylbenzyl) resorcinol thus prepared boiled at 210° C. at 0.6 mm. of mercury. The bis(N-ethylcarbamate) derivative melted at about 186–187° C.

Analysis: Calculated for $C_{25}H_{32}N_2O_4$: N=6.60. Found: N=6.22.

*Example 4*

The procedure of Example 1 was followed, except that 185 g. of 1,1-dimethylbutylbenzene, prepared according to the method of Huston, et al., J. A. C. S. 56, 2432 (1934), were used.

4[4-(1,1-dimethylbutyl)-benzyl]-resorcinol thus prepared boiled at 195–200° C. at the pressure of 0.5 mm. of mercury. The bis(N-ethylcarbamate) derivative melted at about 133° C.

Analysis: Calculated for $C_{25}H_{34}N_2O_4$: N=6.57. Found: N=6.41.

*Example 5*

The procedure of Example 1 was followed except that 169 g. of n-pentylbenzene were used.

4(4-n-pentylbenzyl) resorcinol thus prepared boiled at 210–215° C. at a pressure of 1 mm. of mercury and had refractive index $n_D^{25}=1.5710$. The product crystallized gradually on standing at room temperature, yielding a straw-colored waxy solid, which softened at 40–50° C. The bis(N-ethylcarbamate) derivative melted at about 122–123° C.

Analysis: Calculated for $C_{24}H_{32}N_2O_4$: N=6.80. Found: N=6.58.

*Example 6*

The procedure of Example 1 was followed, except that 185 g. of n-hexylbenzene were used.

4(n-hexylbenzyl)-resorcinol thus prepared boiled at 195–200° C. at a pressure of 0.4 mm. of mercury and had refractive index $n_D^{25}=1.5710$. The product crystallized gradually upon standing at room temperature, yielding a pale-yellow waxy crystalline solid which softened at 45–50° C. The bis(N-ethylcarbamate) derivative melted at about 121–122° C.

I claim:

1. A compound represented by the formula

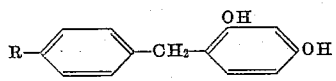

wherein R represents a member of the group consisting of saturated alkyl radicals having from 1 to 9 carbon atoms and cycloalkyl radicals having from 5 to 6 carbon atoms.

2. A compound represented by the formula

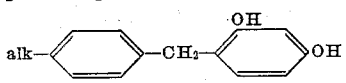

wherein alk is an alkyl radical having from 1 to 9 carbon atoms.

3. A compound represented by the formula

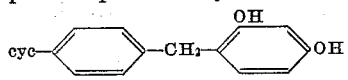

wherein cyc is a cycloalkyl radical having from 5 to 6 carbon atoms.

4. 4[4-(1-methylbutyl)-benzyl]-resorcinol represented by the formula

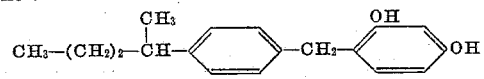

5. 4[4-(1,1-dimethylbutyl)-benzyl]-resorcinol represented by the formula

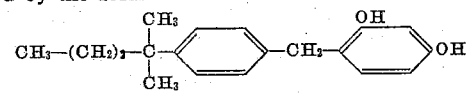

6. 4(4-n-amylbenzyl-resorcinol represented by the formula

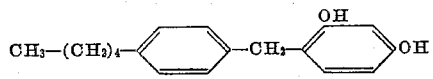

7. 4(4-n-hexylbenzyl)-resorcinol represented by the formula

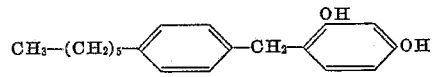

8. 4(4-cyclohexylbenzyl)-resorcinol represented by the formula

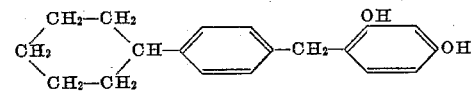

References Cited in the file of this patent

UNITED STATES PATENTS

| | | |
|---|---|---|
| 1,658,229 | Dohme | Feb. 7, 1928 |
| 2,262,249 | Perkins et al. | Nov. 11, 1941 |
| 2,330,722 | Lieber | Sept. 25, 1943 |
| 2,394,754 | D'Alelio | Feb. 12, 1946 |